W. F. WARDEN.

VENTILATOR.

APPLICATION FILED OCT. 8, 1908.

Reissued July 26, 1910. 13,137.

WITNESSES:

Bowman B. West.

Arthur S. Remberg.

INVENTOR,

William F. Warden

BY Bates, Fouts & Hull

ATTYS.

THE NORRIS PETERS CO., WASHINGTON, D. C.

UNITED STATES PATENT OFFICE.

WILLIAM F. WARDEN, OF AKRON, OHIO.

VENTILATOR.

13,137. Specification of Reissued Letters Patent. Reissued July 26, 1910.

Original No. 846,074, dated March 5, 1907, Serial No. 336,406. Application for reissue filed October 8, 1908. Serial No. 456,846.

*To all whom it may concern:*

Be it known that I, WILLIAM F. WARDEN, a citizen of the United States, residing at Akron, in the county of Summit and State of Ohio, have invented a certain new and useful Improvement in Ventilators, of which the following is a full, clear, and exact description, reference being had to the accompanying drawings.

This invention relates to improvements in ventilators of the type wherein there is a flue, a roof spaced above the same and having a translucent portion, and a movable sleeve within the flue adapted to be raised or lowered to control the opening between the flue and roof; and the object thereof is to provide a device of the class named having increased efficiency, wherein leakage is prevented by means directing its passage to the roof of the building, and further provided with means for securely retaining the closure device in a selected position.

A further object is to so construct the device as to permit as much light as possible to pass through it to the interior of the building and to secure the light-admitting substance by a novel and improved holdfast means.

With the foregoing and other objects in view the invention consists in the novel construction, combination, and arrangement of parts constituting the invention to be hereinafter referred to, which form a part of this specification, in which is shown the preferred embodiment of the invention; but it is to be understood that changes, variations, and modifications can be resorted to which come within the scope of the claims hereunto appended.

Figure 1:
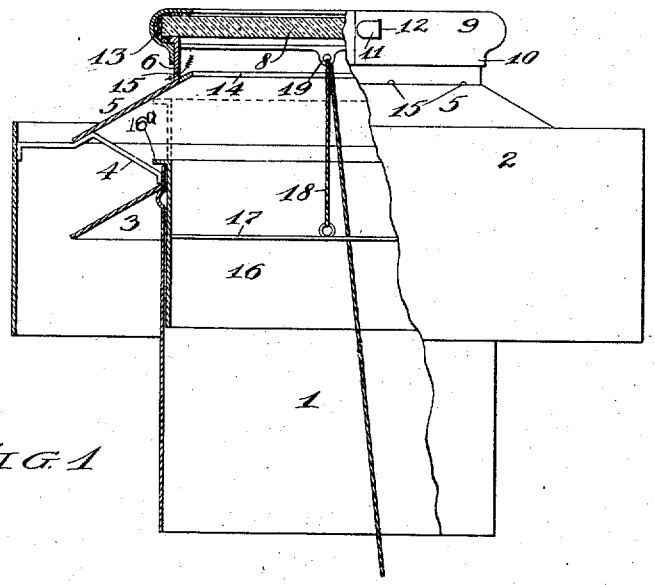
Figure 2:
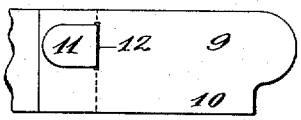
Figure 3:
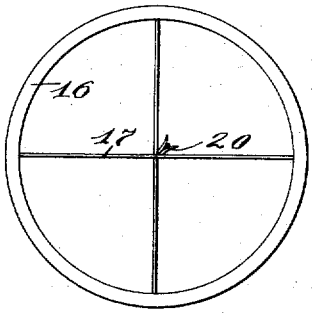

In the drawings, in which similar reference numerals indicate like parts in the different figures, Figure 1 is a side elevation of a ventilator of the type named with a portion thereof in section to better illustrate the invention. Fig. 2 is an enlarged detail of means for securing the band by which the light-admitting portion of the device is retained in position, and Fig. 3 is a detail of the mechanism by which the closure device of the ventilator is maintained in a definite position.

In the drawings, the reference numeral 1 indicates the flue of the ventilator, arranged to be located in the upper part of a building or other structure. The upper portion of the flue 1 is inclosed by a wind-shield 2, spaced apart therefrom and supported by means to be hereinafter more fully described.

Surrounding the upper portion of the flue 1 is a louver 3, above which are a plurality of brackets 4, (only one of which is shown in Fig. 1, which serves to illustrate the construction and position thereof). The wind-shield 2 is attached to these brackets 4, and thereby is supported in proper position with respect to the upper portion of the flue 1. Attached to the brackets 4 is a second louver 5 preferably parallel and in substantial alinement with the louver 3 and spaced apart from the upper end of the flue 1, thereby constituting an air passage. Extending upwardly from the louver 5 is a cylindrical portion 6.

In order to admit light to the structure ventilated by this device, there is placed across the opening inclosed by the cylindrical portion 6 an approximately uninterrupted body of translucent material 8, retained in position by a contractible band or hold-fast device 9 of substantially the configuration shown in Fig. 1, having an upper convex contour integral with a depending cylindrical portion 10. The ends of this band 9 are detachably united together by providing one end thereof with an extended tongue 11, arranged to be passed through a slot 12 in the opposite end of the band and be deflected sufficiently to maintain the band in operative position with respect to the top of the cylindrical portion 6 and the translucent material. The space existing between the member 8 and the band 9 is preferably filled with some packing, such as putty, (indicated in the drawings by the reference numeral 13). Experience has shown that even with the use of a packing between the band 9 and member 8 there still exists a liability of leakage.

In order to convey any liquid which might leak through the joint between the band 9 and the translucent material 8 and which would otherwise drip into the structure ventilated by this device, I place on the interior of the cylindrical portion 6 of the ventilator a trough 14, preferably conoid in form. At selected points through the cylindrical portion 6 are a number of perforations 15, by which any liquid which passes through the joint formed between the members 9 and 8 after passing downward over the inner surface of the cylindrical portion 6 may escape onto the top of the louver 5.

The construction just described is of the greatest importance, for while it is desirable to allow the maximum amount of light possible to pass through the ventilator into the building, which is accomplished by the arrangement of the translucent member 8, it is of equal importance to so mount this translucent member as to allow it to be removed when necessity requires and to provide such a construction so as to absolutely preclude water from entering the building upon which the ventilator is mounted, through the flue of the ventilator. The detachable holding band 9 permits the removal of the translucent top member 8 either for the purpose of cleaning or when that member becomes broken and it is necessary to replace the same. The trough member 14 is so arranged relative to the translucent member and its holding band so as to absolutely prevent any water that may leak past the translucent member and its holding band from passing down the flue, and thereby makes the ventilator non-leakable.

As is common in this type of ventilators, I preferably provide on the interior of the flue 1 a vertically slidable sleeve 16 of a suitable size to be freely slidable therein, which when raised, as indicated in dotted lines in the drawings, closes the opening between the top of the flue 1 and the under surface of the louver 5. This sleeve is provided with an outwardly projecting flange 16[a] at its top adapted to overhang the flue 1, and, when the sleeve is lowered, support the sleeve from the top of the flue. Furthermore, as will appear by reference to Fig. 1 of the drawings, it will be seen that, when the sleeve is elevated to bring the flange against the frusto conical louver 5, the louver projects downwardly beyond the flange and forms a space into which the air currents will eddy when the damper is closed. In rainy or snowy weather, it is almost impossible to keep rain or snow out of a ventilator with an ordinary straight sleeve. The provision of the lateral flange, however, deflects downwardly the eddying currents and prevents the rain and snow from entering the ventilator.

In order to raise the sleeve 16, there is placed across its interior one or more bars 17, to which is attached a rope or cord 18, arranged to pass through a suitable supporting device 19, located adjacent the translucent material 8, and from thence downwardly, as illustrated in Fig. 1, into the interior of the apartment ventilated by this device. When the sleeve 16 is in the position shown in the drawings, the air from the apartment is permitted to pass freely outwardly through the space between the louvers 3 and 5, and when the sleeve is raised into the position indicated in dotted lines in the drawings this exit of air is prevented, as well as the ingress of foreign substances, such as snow, rain, sleet, etc.

In order to retain the sleeve 16 at the point indicated by dotted lines in Fig. 1, or at some other selected point, whereby the exit of air is prevented or controlled, I support, by means of the cross-bars 17, a clip 20, into which the rope may be swung by a slight manipulation by the operator and there held against movement, thus securely retaining the sleeve 16 in the desired position. The clip is made of resilient material and formed with two arms which are together at their inner ends and spread toward their outer ends, the space between the said arms being V-shaped. The cord or rope when swung so as to engage the jaws or arms of the clip will be frictionally held by contact with the said jaws. This construction is very advantageous, inasmuch as the retaining means for the sleeve or damper 16 is carried by that member itself, thus the means for holding the damper in place is made as a part of the ventilator itself and no extraneous means are necessary. The form of the clip here shown and described is particularly advantageous inasmuch as a simple movement of the rope by the operator suffices to bring the rope into position between the jaws of the clip and so securely hold it.

It may be stated that the number of louvers employed in this device may be increased without departing from the scope of this invention; but in each case the upper louver will constitute the roof of the structure in the same manner that the louver 5 does in the specific construction hereinbefore given.

It will be obvious from the foregoing description that substantially the entire area inclosed by the flue 1 is supplied by light admitted through the translucent material 8, and no light-obstructing devices worthy of notice are interposed to prevent its ingress, thus providing an unusually convenient device in lighting apartments wherein ventilators of this type are required, and the ordinary expedients for supporting translucent material commonly used as a portion of a ventilator are entirely eliminated. Another very desirable feature of this ventilator is the fact that when shipping the same from the factory in which it is produced to the building in which it is to be used the translucent material may be shipped separately in a suitable crate to prevent breakage thereof and then placed in position on the ventilator by placing the band 9 in operative engagement therewith and closing the joint between the band 9 and the member 8 with ordinary packing material. It will be obvious that when the ventilator, with its sheet of translucent material fixedly secured thereon, is shipped as a whole the danger of breakage of the translucent material and the disadvantages of shipping the same are greatly increased.

It will be further apparent that in shipping large ventilators the desirability of being able to separately box or crate the sheet of translucent material which is to be employed becomes a very important factor in supplying this type of device.

Having thus described my invention, I claim:

1. In a ventilator, the combination with the flue, of a roof spaced some distance above the same and including a conical member and a cylindrical member rising therefrom, said conical member continuing inward some distance beyond the cylindrical member to form a draining trough, and there being a draining opening through the cylindrical member.

2. The combination in a ventilator, of a flue, a roof therefor spaced apart therefrom and supported thereby provided with an opening approximating in size and area the opening in said flue, an upwardly extending perforated wall on said roof surrounding said opening, a sheet of light-admitting substance mounted on and covering the space inclosed by said wall, means for securing said sheet of light-admitting substance in position, a flange positioned within said wall forming in connection therewith a trough in open communication with the top of said roof through a perforation in said wall, a wind-shield for inclosing the upper end of the flue and said roof, a slidable sleeve arranged when in one position to close the space existing between the upper end of said flue and said roof thereby arresting the entrance of any foreign matters to said flue from the outside thereof, and means for moving said sleeve.

3. In a ventilator, the combination of a flue, a frusto conical louver above the same, a vertically slidable sleeve within the flue adapted to be raised and lowered to control the annular space between the flue and the louver, and an outwardly projecting flange on the upper end of the sleeve adapted to overhang the flue and support the sleeve in its lowermost position.

In testimony whereof, I hereunto affix my signature in the presence of two witnesses.

WILLIAM F. WARDEN.

Witnesses:
SELMA JOHNSON,
MAE RIES.